Oct. 8, 1929.                    E. J. BRADY                    1,731,223
        APPARATUS FOR EFFECTING CONTACT BETWEEN GASES AND DIVIDED SOLIDS
                        Filed July 21, 1928          5 Sheets-Sheet 1

INVENTOR
Edward J. Brady

Oct. 8, 1929.     E. J. BRADY     1,731,223
APPARATUS FOR EFFECTING CONTACT BETWEEN GASES AND DIVIDED SOLIDS
Filed July 21, 1928     5 Sheets-Sheet 2

Oct. 8, 1929.  E. J. BRADY  1,731,223
APPARATUS FOR EFFECTING CONTACT BETWEEN GASES AND DIVIDED SOLIDS
Filed July 21, 1928  5 Sheets-Sheet 3

Oct. 8, 1929.　　　　　E. J. BRADY　　　　　1,731,223
APPARATUS FOR EFFECTING CONTACT BETWEEN GASES AND DIVIDED SOLIDS
Filed July 21, 1928　　　5 Sheets-Sheet 4

WITNESS:
Rob R Kitchel.

INVENTOR
Edward J. Brady
BY
Augustus B Stoughton.
ATTORNEY.

Oct. 8, 1929.　　　　　E. J. BRADY　　　　　1,731,223
APPARATUS FOR EFFECTING CONTACT BETWEEN GASES AND DIVIDED SOLIDS
Filed July 21, 1928　　　5 Sheets-Sheet 5

INVENTOR
Edward J Brady
BY
Augustus B. Stoughton
ATTORNEY.

Patented Oct. 8, 1929

1,731,223

UNITED STATES PATENT OFFICE

EDWARD J. BRADY, OF PHILADELPHIA, PENNSYLVANIA, ASSIGNOR TO THE UNITED GAS IMPROVEMENT COMPANY, OF PHILADELPHIA, PENNSYLVANIA, A CORPORATION OF PENNSYLVANIA

APPARATUS FOR EFFECTING CONTACT BETWEEN GASES AND DIVIDED SOLIDS

Application filed July 21, 1928. Serial No. 294,331.

The present invention relates to the effecting of contact between gases and divided solids.

The object of the invention is to provide improved apparatus for effecting such contact, which apparatus has many advantages which will be indicated hereafter.

There is a great variety of processes in which contact is brought about between gases and divided solids in order to effect chemical or physical changes in them. In some cases the treated solid is the more valuable product of the operation, and in others the treated gas. The present apparatus is adapted for use in a great many of these processes, a few may be enumerated, for illustration as follows,—the purification of gases from hydrogen sulphide by contact with divided iron oxide, the total purification of gases from sulphur by contact with hot iron oxide, the revivification of fouled iron oxide by contact with air, the dehydration of gases by contact with calcium chloride, activated carbon, or other dehydrating agent, the debenzolizing of gas and the removal of gums and gum forming constituents from gas by contact with solid absorbents, the drying of coal or other material by contact with hot products of combustion, and the like.

Generally stated apparatus of the invention includes two opposed perforated walls with space between them, means for moving one perforated wall with respect to the other, means for introducing a divided solid into the upper portion of the space between the walls, means for withdrawing the solid from the lower portion of this space, thereby providing and maintaining a downward flow of the divided solid, and means to pass a gas through said perforations and back and forth across the flow of the solid in a general counterflow direction.

The apparatus is capable of many modifications as to form of the perforated walls and as to the particular means selected to move one wall with respect to the other or to introduce or withdraw the solid from the space between the walls.
The invention also comprises the improvements to be presently described and finally claimed.

The figures of the accompanying drawings show several arrangements of the apparatus, chosen for illustration.

In the drawings

Figure 1:
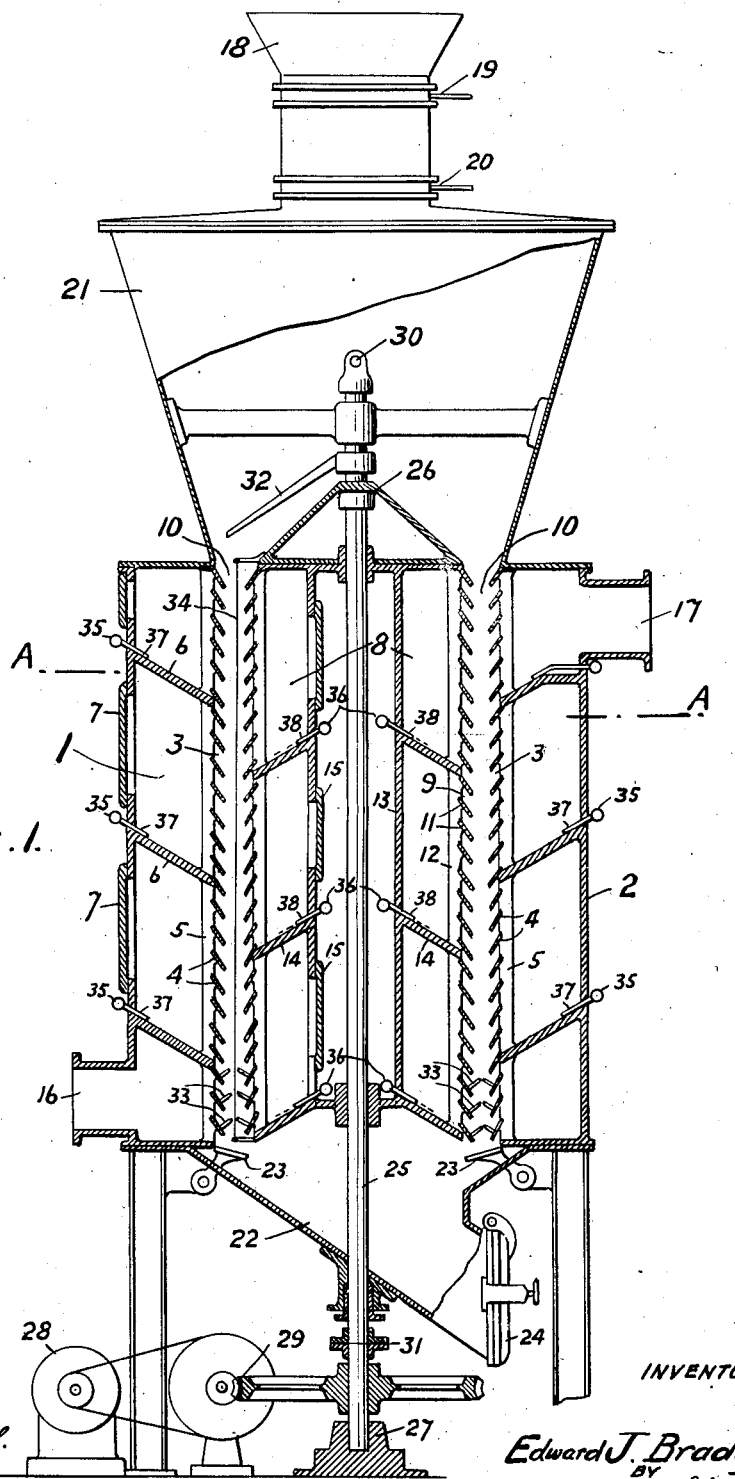
Fig. 1, is a vertical cross section of a preferred form of the apparatus.
Figure 5:
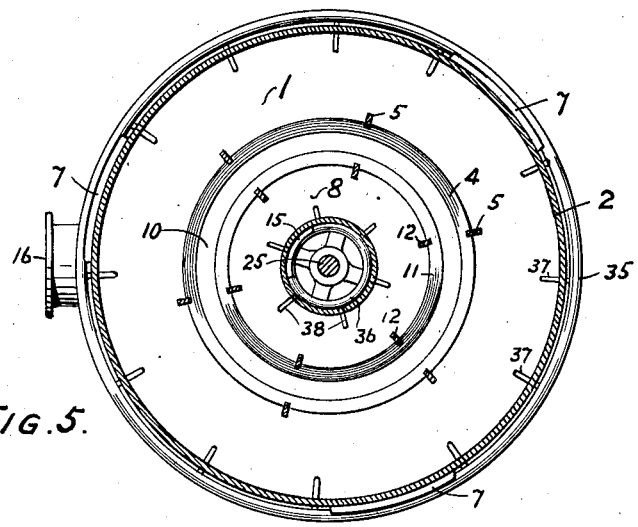
Fig. 5, is a horizontal cross section along the line A—A in Fig. 1.

Referring to Figs. 1 and 5—

1 generally indicates an annular chamber, the outer wall of which 2 is not perforated and forms the shell of the apparatus. The inner wall of this chamber, indicated generally at 3, is formed of the over hanging louver rings 4 which are supported on the ribs 5. The chamber 1 is divided into compartments by the baffles 6. Doors such as 7 may be provided to give access to these compartments.

Within the annular chamber 1 is another annular chamber generally indicated at 8. Its exterior wall 9 is spaced from the interior wall 3 of the outer chamber providing the annular space between them indicated at 10. The wall 9 is formed of the over hanging louver rings 11 which as in wall 3 of the outer chamber provide a perforated wall through which gases may pass. The louver rings 11 are supported on the ribs 12. The inner wall of the chamber is indicated at 13. This wall is not perforated. This interior annular chamber is divided into compartments by the baffles 14 which are staggered with respect to the baffles 6 of the outer chamber. Doors such as 15 give access to these compartments.

The outer chamber 1 is provided with the gas inlet 16 below the lowest baffle and the gas outlet 17 above the uppermost baffle.

18 indicates a feeding hopper communicating through the two gates 19 and 20 to the hopper 21, which communicates at its base with the annular space 10 between the walls 3 and 9 and is adapted to feed a divided solid into this space.

22 is a discharge hopper communicating at its top with the lower portion of the annular space 10 and it is adapted to receive and store for a short or considerable time depending on its size, the divided solid discharging from the annular space 10. Adjustable means such as the dampers 23 are used to regulate the discharge of the solid into the hopper 22. The hopper 22 is provided with the gas tight closure 24.

The interior annular chamber 8 is attached to the vertical shaft 25 and rotates with it. This shaft may be supported by the bearings 26 and 27 and may be driven slowly by any suitable means such as a variable speed motor 28 and the gears 29. The upper end of the shaft may be provided with an eye as 30 whereby the entire inner chamber may be lifted out of the apparatus if desired after removing the top of the hopper 19 and disconnecting the coupling 31. The stirrer 32 may be provided to assist in feeding the solid from the hopper 21 to the annular space 10.

The above described means provide for establishing a descending flow of a divided solid between the louvered walls 3 and 9. Gas entering at the gas inlet 16 is caused by the baffles 6 and 14 to pass backward and forwards through the perforations in the walls 3 and 9 and across the descending column of the solid to the gas outlet 15. The general effect is that of counter flow as the fresh gas encounters the solid about to be discharged and the gas about to be discharged passes through the fresh solid. The slow rotation of the inner cylinder assists materially in maintaining the downward flow of the solid within the annulus 10, preventing undesirable arching over and between the walls which would tend to pass gas through the column without proper contact with the solid. The continuous descent of the particles of solid continually opens up small interstices between these particles for the passage of the gas. With a finely divided solid these interstices are very small individually and provide a very intimate contact between the gas and the solid; they may be great enough however in the aggregate to pass a large volume of gas with little back pressure.

Means may be provided, if desired, to further open up or agitate the descending divided solid and an example of such means is the fingers 3 3, attached to the louver rings 4 and 11. Another example is the taut wire 34 attached to the inner cylinder and rotating with it so as to cut through the column in the annular space 10 and break any arches that might tend to form. A plurality of such wires might be used, spaced at varying distances from the inner louvered wall.

By regulating the discharge by the dampers 23, by varying the rotation of the inner cylinder, or providing agitation means as above indicated, practically any desired condition of relative flow of gas and divided solid may be secured.

The slope of the louvers, the amount they overhang each other, and the spacing between individual louvers may be chosen as is best adapted to the characteristics of the particular solid treated. The required amount of agitation and opening up of interstices between the solid particles will likewise vary with different solids as well as with the physical or chemical changes occurring in the particular treatment effected, therefore the means substantially as described, for securing additional agitation over and above that caused by the movement of the inner wall itself, will vary in different uses to which the apparatus may be put.

In the use of very finely divided solids, there may be a tendency depending on the rate at which gas is passed through the apparatus, for some of the solid to be carried through the louvers into the spaces between the baffles. Where such a solid is treated, the baffles may be sloped as shown in Fig. 1, and means provided to periodically wash out the deposited material.

35 and 36 indicate systems of water piping provided with nozzles such as 37 and 38 respectively. The annular space 10 and the hopper 22 may be emptied and the deposited material in the gas space flushed out with water.

In the form of the apparatus described above the perforated walls are formed by overhanging louvers. This is a preferred form in the use of some solids. The louvers afford some support for the column of the solid all the way up the column and prevent the transfer of all the weight of the upper portion of the column to the lower portion, with the possible compacting too greatly of the material there. The solid may tend to arch over between the louvers, but the rotation of the inner cylinder breaks the arches immediately after formation and prevents their maintenance. The louvered walls also have the advantage of offering in themselves very little resistance to the gas flow through the apparatus.

Figure 2:
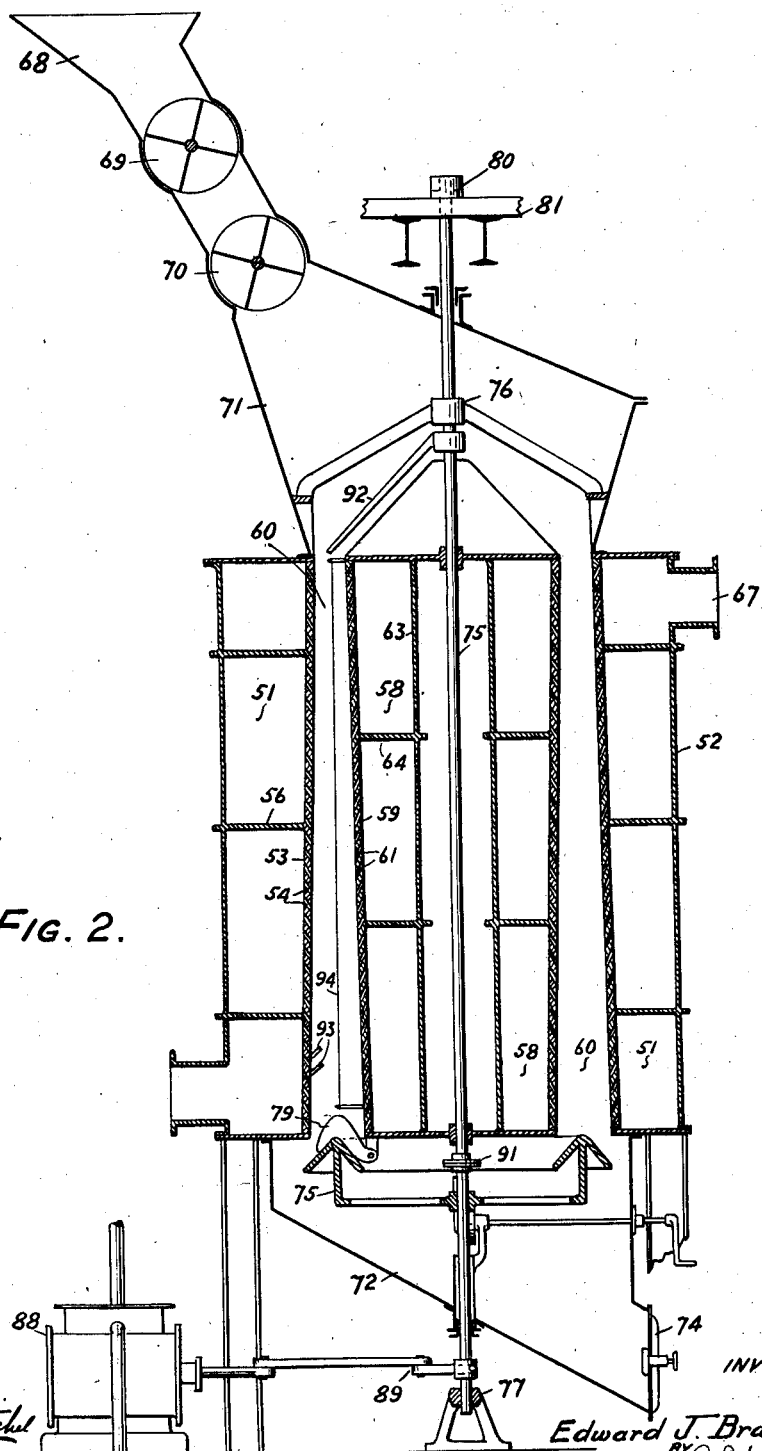
Fig. 2, is a horizontal cross section along the line B—B in Fig. 4.

Referring to Fig. 2:—This figure shows a modification of the apparatus in which the construction and mode of operation are substantially as above described, except as follows:

51 is the outer annular chamber having the outer shell 52. The inner wall of the chamber 53 has the sloping perforations 54. The chamber is divided by the baffles 56.

The inner annular chamber 58 has the outer perforated wall 59 with the sloping perforations 61. It is spaced from the perforated wall of the outer chamber, providing the annular space 60. The inner annular chamber has the interior unperforated wall 63 and is divided by the baffles 64 into compartments. 66 is the gas inlet and 67 the gas outlet.

The feed hopper 68 is provided with the feeding valves 69 and 70, admitting the divided solid to the feeding hopper 71.

The discharge hopper 72 is similar to that in Fig. 1 and is provided with gas tight closure 74, the flow of solid into the discharge hopper is controlled by the annular damper 73 which may be raised and lowered—opening or closing the lower end of the annular space 60. The plow 79—fastened to the inner cylinder scrapes off any material that may tend to lodge on the damper.

The inner annular cylinder is attached to the shaft 75 as in Fig. 1 and moves with this shaft. The shaft is provided with bearings as 76 and 77 and 80 and is suspended from the support 81.

The shaft is oscillated back and forth by means such as the engine 88 and the cranks 89. 91 is a coupling. 92 is a stirrer attached to the shaft as in Fig. 1 and fingers 93 may be provided, as in Fig. 1, to assure agitation or the wires 94 may be provided, attached to the oscillating cylinder. The perforated walls indicated on Fig. 2 as a modification of the louvered construction of Fig. 1 may be more suited to the treatment of some materials than the louvers. The control of discharge from the annular space, indicated in Figure 2 is a means that might be used with the louvered construction of Fig. 1 as might the means for oscillatory motion instead of continuous rotation and the shaft in Fig. 1 might be hung as shown in Fig. 2. In Fig. 2 the perforated walls are shown sloped to give a tapered annular space between them. This Figure 2 shows the annulus decreasing in thickness from the bottom to the top. In some cases it may be preferable to reverse the slope and have the annulus increase in thickness from the bottom to the top.

Figure 4:
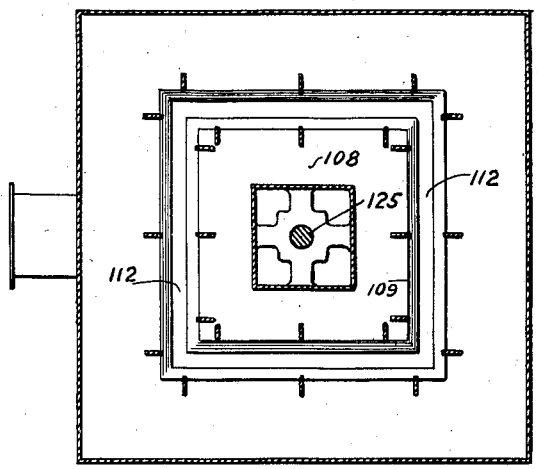
Fig. 4, is a vertical cross section showing an alternative means of moving one perforated wall.
Figure 3:
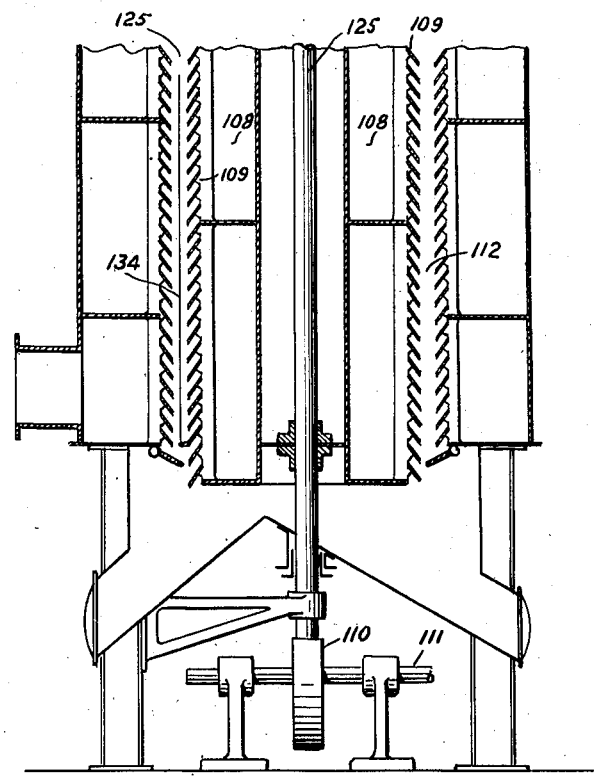
Fig. 3, is a vertical cross section showing a modified form of apparatus.

Referring to Figs. 3 and 4—

The construction and mode of operation of the modification illustrated in these figures are as above described except as follows:

These figures show a modified means of moving one of the perforated walls, in the instance shown a louvered wall, and a modification in cross section of the apparatus.

The shaft 125 together with the inner chamber 108 with its louvered wall 109 is moved up and down by the cam 110—rotated by the shaft 111. This shaft may be driven by any suitable means. The use of the up and down motion instead of rotation permits of the employment of a rectangular apparatus if desired, as indicated. Taut wires such as 134 may be moved through the space 112, as indicated to give further agitation than that provided by the movement of the inner wall.

Figure 6:
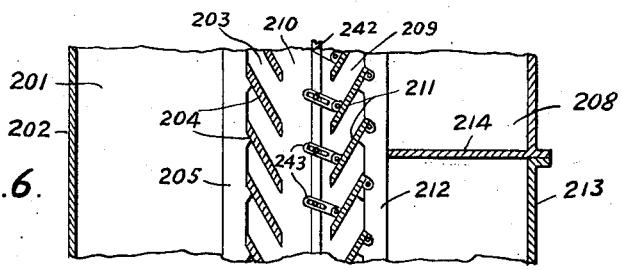
Fig. 6, is a vertical section of a portion of the apparatus of Fig. 4 showing modified means of moving one wall.

Fig. 6 shows another modification, having the same construction and mode of operation, except as follows:

The figure shows a small portion of a vertical section of the apparatus. In this arrangement—both the interior and exterior chambers are stationary, but the louvers of the perforated wall of one chamber are moved.

201 is a section of the exterior chamber with the shell 202 and the perforated wall 203 formed by the louvers 204 supported on the ribs 205. The louvers 204 as shown are stationary.

208 is a section of the interior chamber with the unperforated wall 213, and the perforated wall 209 formed of the louvers 211 supported on the ribs 212.

The two louvered walls are arranged as in Fig. 3 and Fig. 4 to provide the space 210 for the divided solid. The two chambers are baffled as before. One baffle is indicated at 214.

The louvers 211 are pivoted on the ribs 212 and are movable up and down by the bar 242 and the links 243. The bar 242 may be operated up and down by any suitable means. In this case the movement of the louvers 211 furnished the necessary agitation of the divided solid descending through the space 210, opening up interstices for the flow of the gas across this space.

The operation of the apparatus of Figs. 1 and 2 will be further described for explanation in its employment in the purification of gas from hydrogen sulphide by contact with hydrated iron oxide and some of the advantages resulting from the use of the apparatus in this connection pointed out.

Hydrated iron oxide is purifying material very well known to the gas industry and more extensively used than any other to effect hydrogen sulphide purification. It is usually mixed with shavings to give it porosity and placed in large boxes, through a series of which, the gas is passed.

With the present invention the use of shavings is unnecessary, the agitation of the particles in their descent giving the necessary porosity.

The hydrated oxide is charged into the hopper 21, unpurified gas is admitted to the gas inlet 16 and the inner cylinder and its louvered wall, rotated. The oxide descends slowly in an annular column 10 between the louvered walls, being continually crossed and recrossed by the gas.

The oxide reacts with the hydrogen sulphide in the gas to form FeS, $Fe_2S_3$, S and $H_2O$. The gas becomes progressively more free of hydrogen sulphide in each succeeding pass and the oxide becomes progressively fouled during its descent.

The fouled oxide falls into the discharge hopper 22 and the purified gas is discharged at 17. The increasing percentage of sulphide in the oxide may tend to make it less freely flowing in its descent and increased agitation as by the fingers 33 may be provided in the lower portion of the column. The slope of the louvers is chosen to prevent the blowing of the oxide from the column into the gas spaces between the partitions, and the height of the apparatus is chosen to permit the desired degree of purification for a chosen maximum through put of gas.

If the oxide is not completely fouled by one passage through the apparatus, some of the partially fouled oxide may be fed back to the hopper 18.

As an alternative two similar apparatus may be used in series in the gas flow, the second receiving fresh oxide, and the first partially fouled oxide discharged from the second.

The oxide after fouling as completely as is practicable or desired, may be revivified in a similar apparatus. The fouled oxide descending between the louvered walls, while moist air is admitted to the gas inlet, and caused to cross and recross the descending column of fouled oxide, similarly as the gas crossed the fresh oxide in the previous description, revivified oxide being discharged from apparatus for further use in purifying gas.

The rate at which revivification takes place, may be controlled by the amount of moisture admitted along with the air, preventing too rapid generation of heat by the revivifying reaction and the ignition of the sulphur in the fouled oxide. The rate at which revivification takes place may also be controlled in another manner as outlined in connection with the description of Fig. 7 which shows an arrangement of two apparatus, of the type shown for example in Fig. 1, one purifying gas and the other revivifying oxide.

Figure 7:
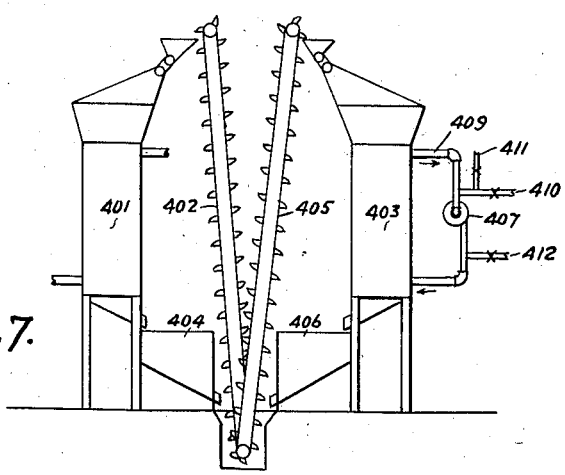
Fig. 7, is a diagrammatic view illustrating two of the apparatus, such as shown in Figs. 1 and 2, arranged for conjoint use.

Referring to Fig. 7—

401 is the apparatus purifying gas and being fed with oxide by the elevator 402. 403 is the apparatus revivifying fouled oxide discharged from apparatus 401, fed by way of the storage hopper 404 and the elevator 405. The revivified oxide from apparatus 403 is discharged into the storage hopper 406 and fed to the apparatus 401 by the elevator 402 before mentioned. Fresh oxide may also be supplied to this elevator if desired instead of or with revivified oxide. If the oxide discharging from apparatus 401 is only partially fouled it may be returned to apparatus 401 with revivified oxide or with fresh oxide or unmixed.

Fouled oxide from 401 may be of course diverted to storage elsewhere if it is not desirable to revivify it.

In Fig. 7—407 is a fan which circulates air in a closed circuit through the revivifying apparatus 403, forcing it into the inlet and withdrawing it from the outlet 409. 410 is a valved inlet of fresh air. 411 is a valved steam line to supply the desired moisture. 412 is valved vent. With recirculation the oxygen in the circulated air becomes exhausted in the performance of the revivification. Any desired quantity of fresh air may be admitted through 410, thereby controlling the oxygen content of the circulated air and controlling the rate of revivification.

The bucket elevators in Fig. 7 are indicated merely for illustration, any other means may be used to convey the oxide for instance it may be desirable to blow the fouled oxide to the top of the revivifying apparatus with air, some revivification taking place en-route.

A modified arrangement to that indicated in Fig. 7 may be the placing of the revivifying apparatus above the purifying apparatus and discharging from the former into the latter by gravity.

In this application to the purifying of gas from hydrogen sulphide by contact with hydrated iron oxide my apparatus has many advantages as compared with present general practice.

The ground space occupied by the present box purified systems is large, and a large excess of oxide is carried in process with a comparatively low turn over. Space is also required for mixing the oxide and shavings and considerable space for storing the mixture. Where revivification is done outside the boxes a considerable space is required for this.

My apparatus requires little ground space—the turn over of oxide is very rapid, requiring comparatively little investment in oxide in process or stock. It does not require mixing of the oxide with shavings and the labor of mixing is saved as well as the space required for storing the mixed oxide. The revivification can likewise be performed on a small ground space.

When the sulphur content of the oxide reaches such an amount as to make it uneconomical for further use, the sulphur may be burned off and recovered or the spent oxide may be sold to chemical manufacturers. As in the use of my apparatus this spent oxide is unmixed with shavings, it has a higher value than the spent oxide from the ordinary box purifiers.

My apparatus lends itself to an economical mechanical handling of the purifying material and provides the operation of a continuous process and in this respect, as well as in the matter of ground space, secures the same advantages as are derived from the liquid purification methods. It however enables the employment of a proven purifying material which is comparatively inexpensive as compared with the reagents used in the liquid purification processes.

My apparatus moreover enables the use of iron oxide without the development of the high back pressure which occurs in the use of the oxide in the ordinary box purifiers as the descending column of oxide in my apparatus offers much less resistance to the passage of gas.

The contact between the gas and the oxide is more intimate in my apparatus than in the box purifiers and the contact more uniform. There is also less fire hazard and danger from explosions. The apparatus is much more flexible with varying gas loads as the through put of oxide can be varied over a wide range.

The apparatus is flexible in another respect as it may be constructed of superposed castings as indicated in Fig. 1 and the height of the apparatus may be easily changed by adding or removing sections.

The oxide through put may be varied automatically if desired in response to changes in $H_2S$ content or in the volume of gas handled.

Figure 8:
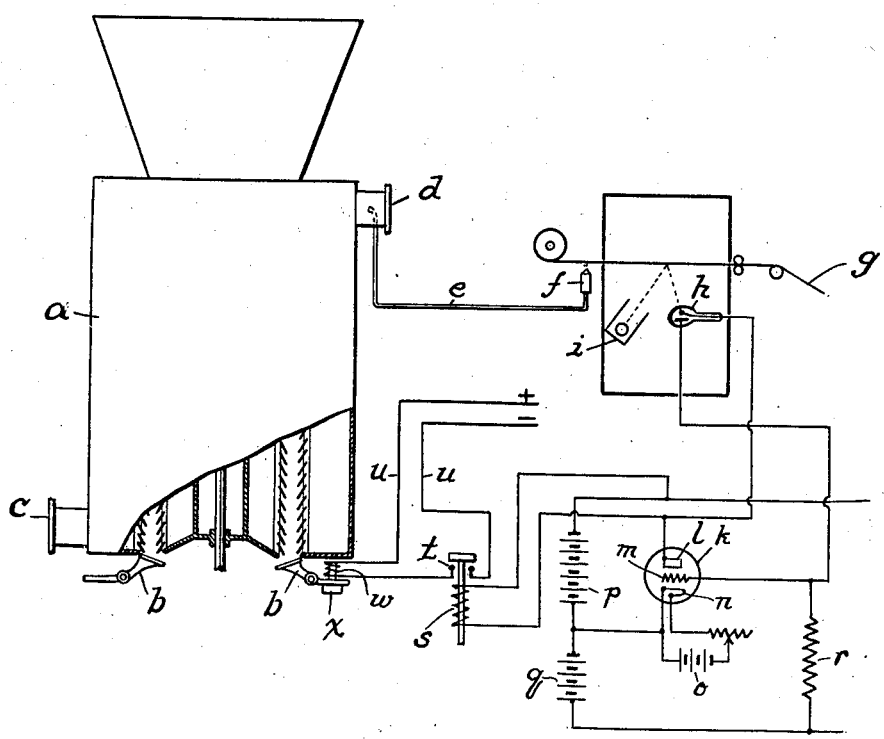
Fig. 8, is a diagrammatic and schematic view illustrating means operatable by the physical condition or chemical composition of the gas for controlling the rate of flow of the divided solid.

For instance an arrangement as shown in Fig. 8 may be employed.

In which $a$, is a gas purification apparatus as previously described with the flow of iron oxide between the louvered walls controlled by the position of the dampers $b$. $c$ is the gas inlet and $d$, the gas outlet. Gas from the outlet may be sampled by the sampling pipe $e$, and led to the small jet $f$. $g$ is a strip of lead acetate paper, which darkens on exposure to hydrogen sulphide. The lead acetate paper moves continuously over the jet and then over the photo-electric cell $h$. A small light source as the small electric light bulb $i$, is arranged so that its light is reflected onto the photo-electric cell. The quantity of light reflected will vary with the darkness of the paper which varies with the hydrogen sulphide in the gas.

Any means of amplifying the response of the photo-electric cell to the varying quantity of light falling on it may be employed. As for instance the arrangement shown, in which $k$ is a standard three element radio tube having the plate $l$, the grid $m$ and the filament $n$. The filament is lit by the A battery $o$. A B battery $p$ and a C battery $q$ may be connected as shown. The C battery supplies a negative bias to the grid through the resistance $r$. When light falls on the photo-electric cell the R. I. drop in the resistance $r$ decreases the negative bias on the grid and increases the plate current, energizing the relay $s$ in the plate circuit. A decrease in the light falling on the photo-electric cell caused by increased darkness of the lead acetate paper causes a decrease in the plate current because of the increase in the negative bias on the grid produced by the lowering of the R. I. drop through the resistance $r$ which is produced by the lower current flowing through the cell.

The relay $s$ may be arranged so that a chosen decrease in plate current will close the gap $t$ in a circuit supplied from the line $u$. This current includes the electro-magnet $w$. This magnet is arranged to lift, when energized, the lever arm $x$ on the damper $b$, which depresses the damper, increasing the flow of oxide through the purifier in response to the decrease in plate current caused by increase in hydrogen sulphide content of the gas.

When the increased flow of oxide has sufficiently lowered the hydrogen sulphide content in the gas, the plate current will increase again and open the gap $t$ deenergizing the magnet $w$. A counter weight on the lever $x$ returns the damper $b$ to its original position, decreasing the flow of oxide.

I do not claim the method of amplifying the current from the photo-electric cell as this is old in the art.

It will be obvious to those skilled in the art to which the invention relates that modifications may be made in details of construction and arrangement and in matters of mere form without departing from the spirit of the invention which is not limited to such matters or otherwise than as the prior art and the appended claims may require.

I claim:

1. Apparatus for effecting contact between gases and divided solids having, in combination, two confronting perforated walls with space between, means for relatively moving said walls, means for introducing a divided solid into the upper portion of said space, means for withdrawing the solid from the lower portion of said space, thereby providing and maintaining a downward flow of the divided solid, and means for passing a gas through said perforations and back and forth across the flow of the solid in general counter flow relation.

2. Apparatus for effecting contact between gases and divided solids including in combination, an annular chamber having an imperforate outer wall constituting the shell of the apparatus and having an inner wall provided with louver like openings, a second annular chamber arranged in the first chamber and having an imperforate inner wall and an outer wall provided with louver like openings spaced from the first mentioned louver like openings, means for relatively moving the walls having louver like openings, means for introducing a divided solid at the top of the space between said louver like walls, means for withdrawing the solid from the lower portion of said space, means for introducing gas at the bottom of the apparatus, means for withdrawing gas at the top of the apparatus, and baffle plates in said chambers for passing gas through said louver like openings and back and forth across the flow of the solid in general counter flow relation.

3. Apparatus for effecting contact between gases and divided solids having, in combination, two confronting perforated walls with space between, fingers projecting from said walls, means for relatively moving said walls, means for introducing a divided solid into the upper portion of said space, means for withdrawing the solid from the lower portion of said space, thereby providing and maintaining a downward flow of the divided solid, and means for passing a gas through said perforations and back and forth across the flow of the solid in general counter flow relation.

4. Apparatus for effecting contact between gases and divided solids having, in combination, two confronting walls arranged with space between and having louver like openings, means for relatively moving said walls, means for introducing a divided solid into the upper portion of said space, means for withdrawing the solid from the lower portion of said space, thereby providing and maintaining a downward flow of the divided solid, and means for passing a gas through said perforations and back and forth across the flow of the solid in general counter flow relation.

5. Apparatus for effecting contact between gases and solids having, in combination, two confronting perforated walls with space between. Wires arranged in said space, means for relatively moving said walls, means for introducing a divided solid into the upper portion of said space, means for withdrawing the solid from the lower portion of said space, thereby providing and maintaining a downward flow of the divided solid, and means for passing a gas through said perforations and back and forth across the flow of the solid in general counter flow relation.

6. Apparatus for effecting contact between gases and divided solids including, in combination, a chamber having an imperforated outer wall and a perforated inner wall, a second chamber arranged in the first chamber and having an imperforate inner wall and a perforated outer wall spaced from the first mentioned perforated wall, inclined baffle plates in said chambers, means for supplying fluid through said imperforate walls and onto said baffle plates for cleaning purposes, inlet and outlet connections for introducing a divided solid at the top and removing it at the bottom of the space between said perforated walls, and means for passing gas back and forth across the flow of the solid and through the perforated walls.

7. Apparatus for effecting contact between gases and divided solids comprising two upright annular chambers having closed ends and arranged one within the other with space between, a closed feeder communicating with said space at the top, a closed delivery hopper communicating with said space at the bottom, a vertical axis about which the inner chamber is rotatable, baffle plates subdividing said chambers into compartments, a gas inlet to the lower compartment, a gas offtake from the upper compartment, the confronting walls of said chambers being perforated, and means for turning the inner chamber.

8. Apparatus for effecting contact between gases and divided solids comprising two upright annular chambers having closed ends and arranged one within the other with space between, a closed feeder communicating with said space at the top, a closed delivery hopper communicating with said space at the bottom, adjustable means for controlling the exit of material from said space, a vertical axis about which the inner chamber is rotatable, baffle plates subdividing said chambers into compartments, a gas inlet to the lower compartment, a gas offtake from the upper compartment, the confronting walls of said chambers being perforated, and means for turning the inner chamber.

9. Apparatus for effecting contact between gases and divided solids comprising two upright annular chambers having closed ends and arranged one within the other with space between, a closed feeder communicating with said space at the top, a closed delivery hopper communicating with said space at the bottom, means operatable by the degree of effectiveness of the contact between the gas and the solid for varying the flow of the divided solid through the apparatus, a vertical axis about which the inner chamber is rotatable, baffle plates subdividing said chambers into compartments, a gas inlet to the lower compartment, a gas offtake from the upper compartment, the confronting walls of said chambers being perforated, and means for turning the inner chamber.

EDWARD J. BRADY.